United States Patent
Muchow et al.

(10) Patent No.: US 7,252,008 B2
(45) Date of Patent: Aug. 7, 2007

(54) MICROMECHANICAL PIEZORESISTIVE PRESSURE SENSOR DEVICE

(75) Inventors: Joerg Muchow, Reutlingen (DE); Hubert Benzel, Pliezhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/128,147

(22) Filed: May 11, 2005

(65) Prior Publication Data
US 2005/0252302 A1 Nov. 17, 2005

(30) Foreign Application Priority Data
May 11, 2004 (DE) .................. 10 2004 023 063

(51) Int. Cl.
*G01L 9/06* (2006.01)
(52) U.S. Cl. ............................. 73/721; 73/727
(58) Field of Classification Search ............. 73/754, 73/720, 721, 727, 719, 725, 734; 257/415
See application file for complete search history.

(56) References Cited

U.S. PATENT DOCUMENTS

| | | | | |
|---|---|---|---|---|
| 3,456,226 A | * | 7/1969 | Vick | 338/2 |
| 3,624,714 A | * | 11/1971 | Frassrand | 73/148 |
| 3,697,918 A | * | 10/1972 | Orth et al. | 338/3 |
| 4,430,895 A | * | 2/1984 | Colton | 73/497 |
| 4,672,411 A | * | 6/1987 | Shimizu et al. | 257/419 |
| 5,485,753 A | * | 1/1996 | Burns et al. | 73/720 |
| 5,714,690 A | | 2/1998 | Burns et al. | |
| 6,278,167 B1 | * | 8/2001 | Bever et al. | 257/415 |
| 6,936,902 B2 | * | 8/2005 | Reichenbach et al. | 257/415 |
| 7,055,392 B2 | * | 6/2006 | Muchow et al. | 73/715 |

FOREIGN PATENT DOCUMENTS

DE    100 32 579    1/2002

OTHER PUBLICATIONS

Chau, et al., "High-Stress and Overrange Behaviour of Sealed-Cavity Polysilicon Pressure Sensors", IEEE Solidstate Sensor and Actuator Workshop, Jun. 4, 1990, pp. 181-183.

* cited by examiner

*Primary Examiner*—Andre J. Allen
(74) *Attorney, Agent, or Firm*—Kenyon & Kenyon LLP

(57) ABSTRACT

A micromechanical piezoresistive pressure sensor device having a sensor substrate, in which an essentially rectangular diaphragm region is provided; a piezoresistive resistance device having at least one piezoresistive resistor strip, which runs parallel to the longitudinal edges of the diaphragm device across the entire length of the diaphragm device and onto the surrounding sensor substrate; the piezoresistive resistor strip having a narrow center region and widened end regions and the widened end regions running across the short edges of the diaphragm device.

13 Claims, 3 Drawing Sheets

MICROMECHANICAL PIEZORESISTIVE PRESSURE SENSOR DEVICE

FIELD OF THE INVENTION

The present invention relates to a micromechanical piezoresistive pressure sensor device. Although applicable to any semiconductor chip system, the present invention as well as the problem underlying it are explained with respect to a micromechanical piezoresistive pressure sensor device for use in the automotive field.

BACKGROUND INFORMATION

The current construction of micromechanical piezoresistive pressure sensors for use in the automotive field provides for four piezoresistive resistor strips, which in each case are located at the center of the edge of a square diaphragm and are interconnected to form a Wheatstone bridge.

From U.S. Pat. Nos. 5,485,753 and 5,714,690, rectangular diaphragms are known, on which the piezoresistive resistor strips run parallel to the long edge. From K. H.-L. Chau et al., "HIGH-STRESS AND OVERRANGE BEHAVIOUR OF SEALED-CAVITY POLYSILICON PRESSURE SENSORS", IEEE Solidstate Sensor and Actuator Workshop, Jun. 4, 1990, pages 181 through 183, rectangular diaphragms having an aspect ratio greater than 3:1 are known.

FIG. 4 shows a micromechanical piezoresistive pressure sensor device known from U.S. Pat. No. 5,714,690.

In FIG. 4, reference character 30 designates a silicon sensor substrate having a diaphragm region 36. Diaphragm region 36, for example, is a region of substrate 30 that has been thinned from the back using an anisotropic etching method.

Diaphragm region 36 has a rectangular shape with a high aspect ratio, which means that the long sides of the diaphragm edge 39 are significantly longer than the narrow sides. Piezoresistive resistor strips 35a, 35b run in the central region 91 of diaphragm region 36 parallel to the latter's long sides, that is, strip 35a near the longitudinal edge and strip 35b at the longitudinal center line 4a. Thus strip 35a is located in a region of high tensile stress and strip 35b in the region of the highest compressive stress. At their ends, strips 35a, 35b are bent and lead into bonding surfaces 31a, 32a or 31b, 32b, which are provided on the surface of substrate 30.

In the case of a rectangular diaphragm region 36, the surface requirement for achieving a specified sensitivity is greater than that in the case of a square diaphragm. In the case of a rectangular diaphragm, however, the resistance of the strip, which runs parallel to the long edge at the center of the diaphragm, is in quantitative terms approx. 50% lower. The center resistance displays over pressure a higher nonlinearity than the edge resistance.

The square diaphragm has the advantage that, although the piezoresistive resistor strip pairs differ in terms of their sign, they are almost identical in quantitative terms and do not differ in their nonlinear behavior.

The mentioned problem is likely responsible for the fact that rectangular diaphragms so far are not finding a significant use in commercial micromechanical piezoresistive pressure sensor devices.

In U.S. Pat. No. 5,714,690, moreover, piezoresistive resistor strips 35a, 35b run perpendicularly across the longitudinal edge of diaphragm region 36. This immediately reduces the sensitivity since the direction of the current is here turned by 90° with respect to the region relevant for the measurement and is thus running parallel to the mechanical stress.

SUMMARY OF THE INVENTION

In contrast with the known design approaches, the micromechanical piezoresistive pressure sensor device according to the present invention has the advantage that the entire length of the rectangular diaphragm is available for the resistor strip and interference effects due to the traversal of the short edge are avoided such that other properties are preserved even in an elongation, particularly the sensitivity, nonlinearity and disappearing offset. Thus the bridge may be designed to be particularly highly resistive by using long resistor strips having a narrow center region.

The micromechanical piezoresistive pressure sensor device according to the present invention is hence particularly suitable for autonomous systems such as tire pressure sensors, for example, that do not have an external connection to a power source, but are supplied by a battery and must therefore be minimized with respect to their power consumption. In the case of a tire pressure sensor, for example, the service life of the system as a whole should be 10 years. Two measures lend themselves for this purpose:

a) pulsed operation; and
b) minimizing the power consumption during measurement.

For the Wheatstone bridge this means that it must be designed to be as highly resistive as possible. If one disregards the comparatively low resistance of the supply line, then the interior resistance of the Wheatstone bridge is identical to the resistance of the respective piezoresistive resistor strips. Designing the rectangular diaphragm for a specified pressure range merely requires the calculation of the mechanical stresses at the location of the resistor strips as a function of the diaphragm thickness and the length of the short edge.

The idea at the basis of the present invention is for the piezoresistive resistor strips running parallel to the longitudinal edge of the diaphragm region to be extended beyond the short side. So as to change the bridge output signal as little as possible in the process, the piezoresistive resistor strips are widened in the region of the short edges. This has the consequence that due to the locally low resistance value, the interfering signal influence of deformations at the short edge only have an insignificant effect in the overall signal of the Wheatstone bridge.

A maximum sensitivity may be achieved if the resistances are at the voltage maximum. This requires a technology that has a small variation in the position of the diaphragm edge. For example, the SOI process known from U.S. Pat. No. 5,714,690 offers this possibility, but also requires at least the processing of two wafers and their connective surfaces. There, however, the etching of the back using KOH or the like is problematic.

A surface-mechanical manufacturing process, for example, only requires one wafer and its processing from only one side. A method of this type, as it is known for example from German Published Patent Application No. 100 32 579, is hence more cost-effective. In this method, a cavity is created using porous silicon, which is produced in front of an epitaxy layer in the region of the diaphragm and which is transferred in the epitaxy in such a way that a hollow space is created underneath the diaphragm.

When using two piezoresistive pairs of resistor strips, a complete Wheatstone bridge allows for the sensitivity to be increased by 50% for the same size of diaphragm, while at the same time the offset can be minimized by a suitable design.

In contrast to U.S. Pat. No. 5,714,690, the contacting of the piezoresistive resistor strips can be designed more favorably. In particular, it is not necessary to provide separate bonding surfaces since the ends of the piezoresistive resistor strips on the substrate are already widened. According to the present invention, a supply line is provided, which is gradually widened the further it enters into the counterfactually acting short-edge region of the mechanical stress. In particular, these types of wedge-shaped ends of the piezoresistive strips allow for an offset-neutral design.

If the sensor chip is mounted in an overhanging manner into a housing, the chip being attached near its short diaphragm edge, then the offset error may be greatly reduced by the symmetrical structure with respect to the mounting. This is a further advantage over square diaphragms having one resistor at each edge. The stress built in by the mounting acts equally on each resistor strip and hence does not make itself felt as nonlinearity, e.g. hysteresis.

According to a preferred specific embodiment, the piezoresistive resistance device has four piezoresistive resistor strips, which are essentially uniformly designed and symmetrically arranged with respect to the longitudinal center line of the diaphragm device and which run parallel to the longitudinal edges of the diaphragm device across the entire length of the diaphragm device and onto the surrounding sensor substrate, the four piezoresistive resistor strips having a narrow center region and a widened end regions and the widened end regions running across the short edges of the diaphragm device. This first preferred aspect provides for the implementation of a full bridge that is as symmetrical as possible on a rectangular diaphragm, two resistor strips being positioned at the respective longitudinal edges on the diaphragm and two resistor strips being positioned above and below the center line. For this purpose, the center resistors must be slightly decentered, the one somewhat to the left of center, the second somewhat to the right of center. The distance between both resistor strips is specified by the minimum measure of the layout rules. When the diaphragm is deformed, one of the pairs of resistor strips experiences tensile stress, while the other experiences compressive stress. In the usual interconnection to yield a Wheatstone bridge, a pressure-proportional output signal is obtained.

According to another preferred specific embodiment, the piezoresistive resistance device has four piezoresistive resistor strips, which are essentially uniformly designed and symmetrically arranged with respect to the longitudinal center line of the diaphragm device, of which a first and a second piezoresistive resistor strip run parallel to the longitudinal edges of the diaphragm device across the entire length of the diaphragm device and onto the surrounding sensor substrate and of which a third and a fourth piezoresistive resistor strip run parallel to the longitudinal edges of the diaphragm device across the surrounding substrate, the four piezoresistive resistor strips having a narrow center region and widened end regions and the widened end regions of the first and the second piezoresistive resistor strips running across the short edges of the diaphragm device.

This second preferred aspect thus provides for using no center resistors, but only edge resistors. To form a Wheatstone bridge, two resistor strips identical in layout are laid onto the mainland, i.e. onto the substrate at a sufficient distance from the diaphragm region. This arrangement also ensures an offset of nearly zero when the diaphragm is not deformed. The advantage with respect to the first aspect lies in the fact that the center resistors with their higher nonlinearity are eliminated. The sensitivity, however, is 25% lower than in the first aspect. The center resistors have 50% of the relative resistance change under pressure with respect to the edge resistors since the mechanical stresses at the center are only half as great as at the edge.

DETAILED DESCRIPTION

Figure 1:
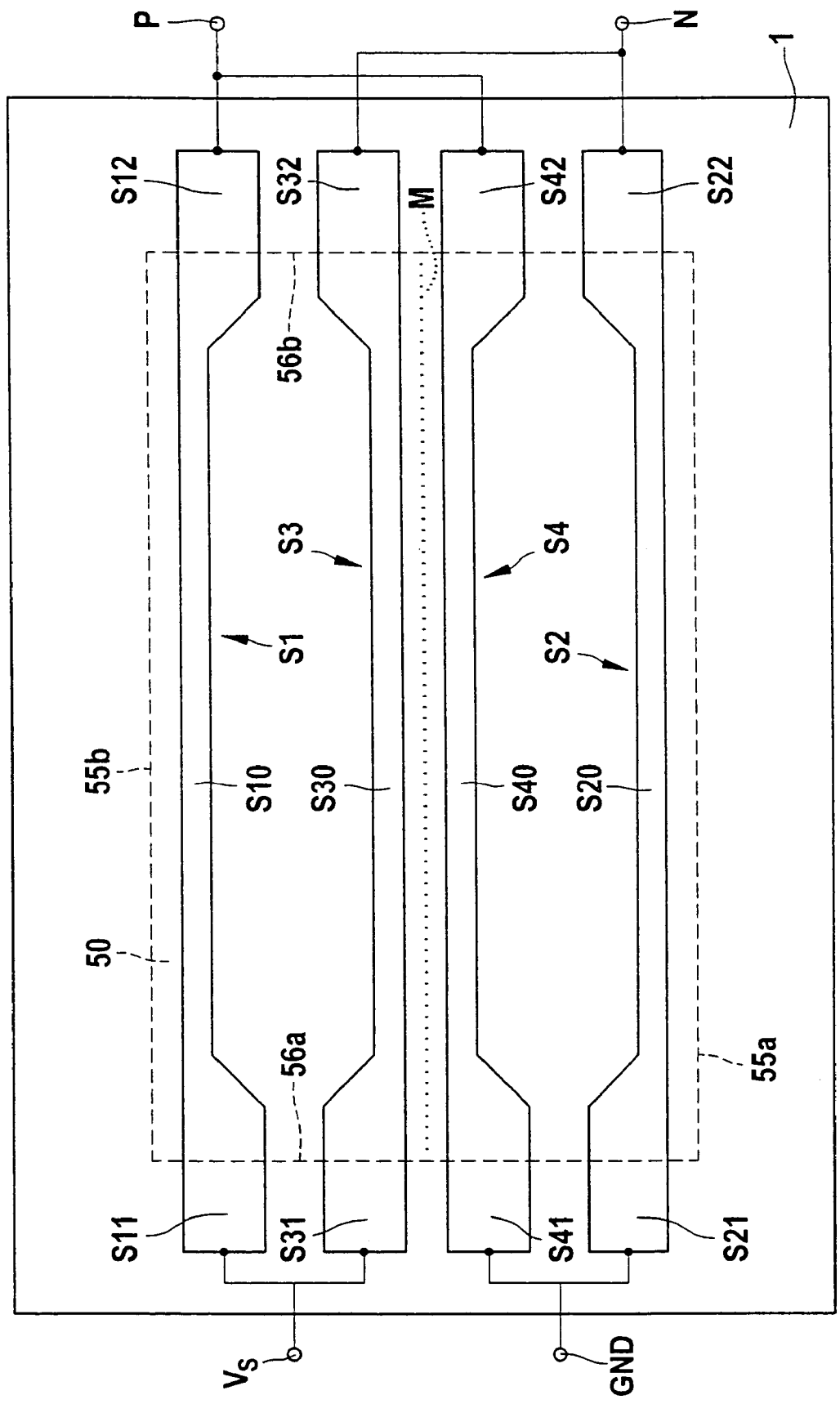
FIG. 1 shows a first specific embodiment of the micromechanical piezoresistive pressure sensor device according to the present invention.

In the figures, components which are the same or functionally equivalent are denoted by the same reference characters.

FIG. 1 shows a first specific embodiment of the micromechanical piezoresistive pressure sensor device according to the present invention.

In FIG. 1, reference numeral 1 designates a sensor substrate in which a diaphragm region 50 is provided. Diaphragm region 50 has longitudinal edges 55a, 55b and short edges 56a, 56b. Four parallel piezoresistive resistor strips S1 to S4 are provided over diaphragm region 50. The resistor strips S1, S2 lie at the edge of diaphragm region 50 and run parallel to longitudinal edges 55a and 55b. Resistor strips S3, S4 are likewise arranged parallel to longitudinal center line M, that is, in each case displaced upward and downward by the same distance. All resistor strips S1 to S4 have a narrow center region S10, S20, S30, S40 and a widened outer region S11, S12, S21, S22, S31, S32, S41, S42.

The widening begins continuously immediately before entering the proximity of short edges 56a and 56b and occurs on the side of the strip facing away from the respective longitudinal edge 55a and 55b.

FIG. 1 shows a schematic representation of the interconnection of piezoresistive resistor strips S1 to S4 to yield a Wheatstone bridge. A supply voltage VS is applied to end regions S11, S31, and ground potential is applied to end regions S41, S21. The positive bridge output signal P is obtained by interconnecting end regions S12, S42, and the negative bridge output signal N is obtained by interconnecting end regions S22, S32.

Particularly advantageous in this embodiment is the fact that, due to the widening of the piezoresistive resistor strips S1 to S4 in the end regions, it is possible to keep the signal interferences from short edges 56a, 56b very low.

Figure 2:
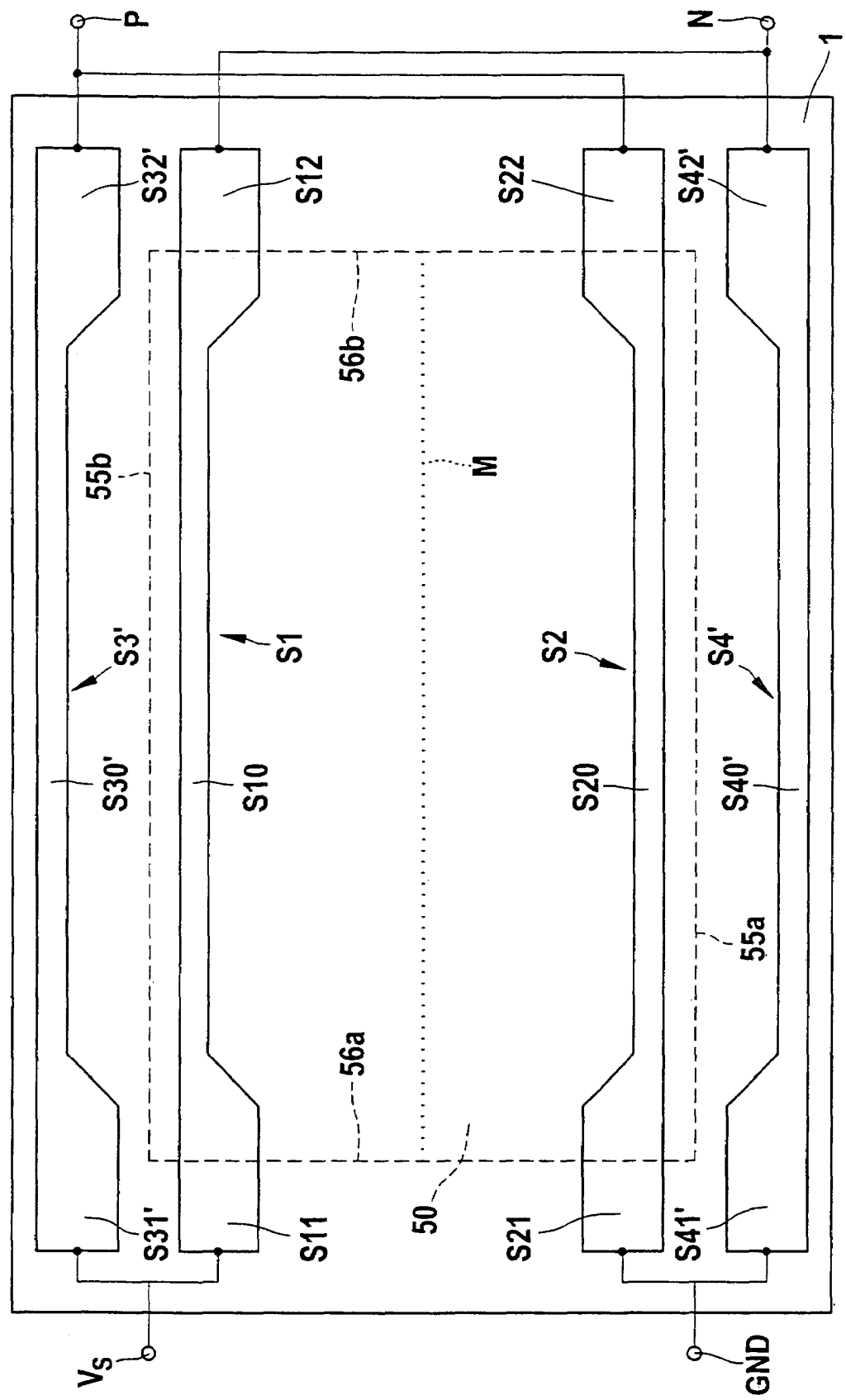
FIG. 2 shows a second specific embodiment of the micromechanical piezoresistive pressure sensor device according to the present invention.

FIG. 2 shows a second specific embodiment of the micromechanical piezoresistive pressure sensor device according to the present invention.

In the second specific embodiment shown in FIG. 2, the two center resistor strips S3, S4 of the first specific embodiment are lacking. In this second specific embodiment, two alternative resistor strips S3'. S4' are provided on sensor substrate 1 next to diaphragm region 50, which likewise run parallel to longitudinal edges 55a, 55b as do resistor strips S1, S2. To design the bridge symmetrically, resistor strips S3', S4' also have a narrow center region S30', S40' and widened end regions S31', S32' and S41', S42'.

The interconnection to yield a bridge occurs in the specified form by applying supply potential VS to end regions S11, S31' and ground potential GND to end regions S21, S41'. Positive bridge output signal P is obtained by interconnecting end regions S22, S32', while negative bridge output signal N is obtained by interconnecting end regions S22, S42'.

Figure 3:
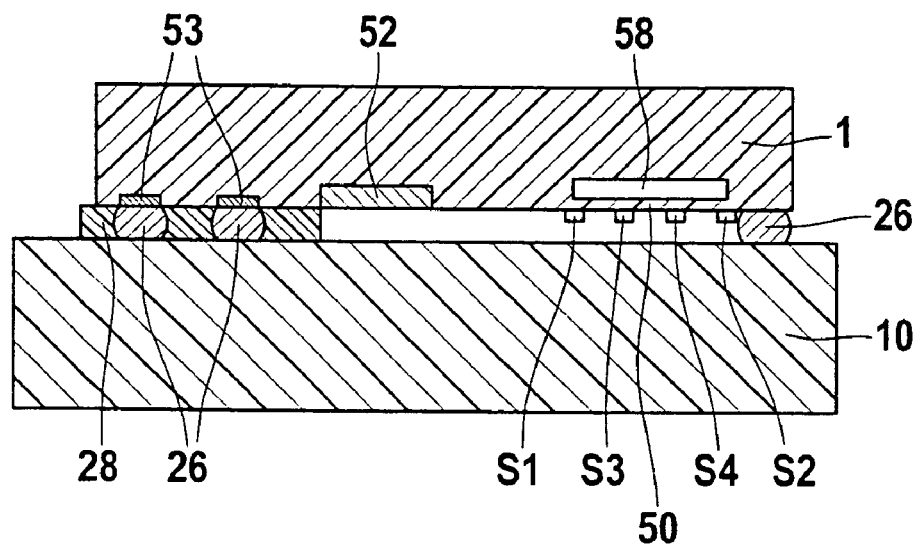
FIG. 3 shows a mounting example for a micromechanical piezoresistive pressure sensor device according to FIGS. 1 and 2.
Figure 4:
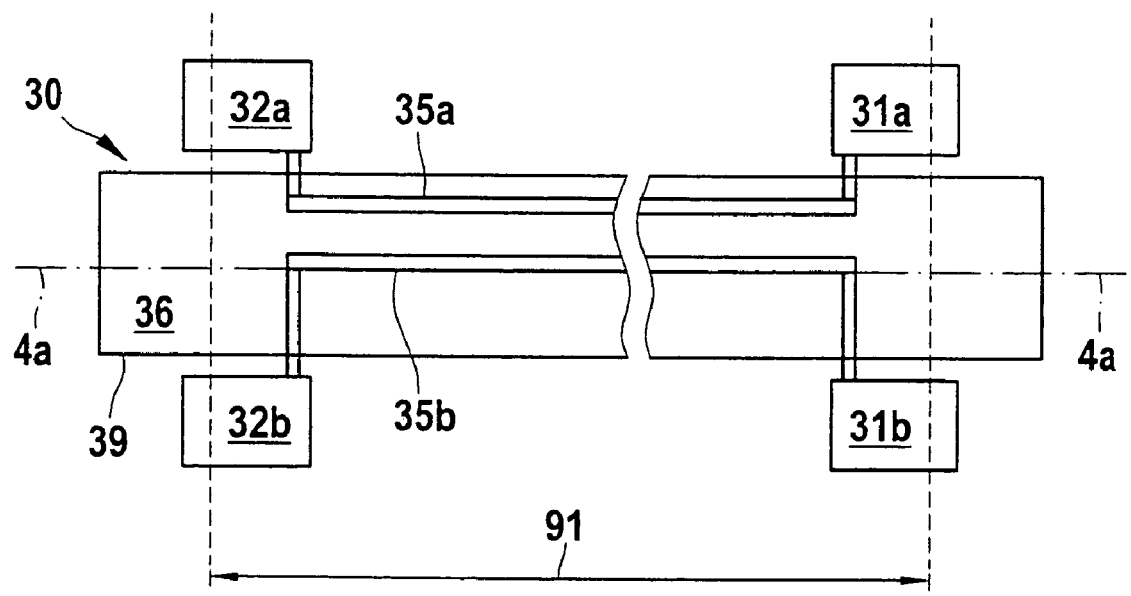
FIG. 4 shows a micromechanical piezoresistive pressure sensor device known from U.S. Pat. No. 5,714,690.

FIG. 3 shows a mounting example for a micromechanical piezoresistive pressure sensor device according to FIGS. 1 and 2.

In the mounting example shown in FIG. 3, sensor chip 1 is a surface-micromechanical sensor chip, which was produced, for example, according to the method described in DE 100 32 579 A1, and which has an integrated cavity 58 above diaphragm region 50. Sensor chip 1 has an integrated evaluation circuit 52.

Sensor chip 1 is mounted in an overhanging manner on substrate 10 using flip-chip technique. For mounting, bondpads 53 of sensor chip 1 are soldered onto bondpads (not shown) of substrate 10, using a solder or adhesive connection, e.g. small solder balls 26. The mounting region additionally has an underfilling 28 made of an insulating plastic material.

In diaphragm region 50, sensor chip 1 is passivated on the surface by a layer (not shown), e.g. a nitride layer, which acts as a secure medium protection. In the mounting region, sensor chip 1 is protected from corrosion by underfilling 28. Finally, the structure according to FIG. 3 may be packaged in a housing (not shown in this figure).

Although the present invention has been explicated above with reference to preferred specific embodiments, it is not restricted to them, but may also be implemented in other ways. Particularly, the present invention is not restricted to a specific number or geometry of the resistor strips.

REFERENCE CHARACTER LIST

| | |
|---|---|
| 1, 30 | Sensor Substrate |
| 50, 36 | Diaphragm Region |
| 55a, 55b | Longitudinal Edges |
| 56a, 56b | Short Edges |
| S1–S4; S1, S2, S3', S4', 35a, 35b | Resistor Strips |
| 31a, 32a, 31b, 32b | Bondpads |
| S11, S12, S21, S22, S31, S32, S41, S42; S11, S12, S21, S22, S31', S32', S41', S42' | End Regions |
| S10–S40; S10, S20, S30', S40' | Center Region |
| M, 4a | Longitudinal Center Line |
| VA | Supply Voltage |
| GND | Ground Potential |
| P | Positive Bridge Output Signal |
| N | Negative Bridge Output Signal |
| 53 | Bondpad |
| 26 | Small Solder Balls |
| 28 | Underfilling |
| 58 | Hollow Space |
| 36 | Support Base |
| 52 | Evaluation Circuit |
| 10 | Support |
| 39 | Diaphragm Edge |
| 91 | Center Region |

What is claimed is:

1. A micromechanical piezoresistive pressure sensor device, comprising:
a sensor substrate including a substantially rectangular diaphragm region; and
a piezoresistive resistance device including at least one piezoresistive resistor strip that runs parallel to longitudinal edges of the diaphragm region across an entire length of the diaphragm region and onto a surrounding portion of the sensor substrate, wherein:
the piezoresistive resistor strip includes a narrow center region and widened end regions, and the widened end regions run across short edges of the diaphragm region.

2. The pressure sensor device as recited in claim 1, wherein the narrow center region near the short edges on the diaphragm region widens into a respective widened end region.

3. The pressure sensor device as recited in claim 1, wherein the widened end regions in a wedge-shaped manner pass over into the associated narrow center region.

4. The pressure sensor device as recited in claim 1, wherein the piezoresistive resistance device includes four piezoresistive resistor strips that are substantially uniformly designed and symmetrically arranged with respect to a longitudinal center line of the diaphragm region and that run parallel to the longitudinal edges of the diaphragm region across an entire length of the diaphragm region and onto the surrounding portion of the sensor substrate, wherein the four piezoresistive resistor strips have a narrow center region and widened end regions, and wherein the widened end regions run across the short edges of the diaphragm region.

5. The pressure sensor device as recited in claim 4, wherein:
a first one of the at least one piezoresistive resistor strip is provided near one of the longitudinal edges,
a second one of the at least one piezoresistive resistor strip is provided near another one of the longitudinal edges,
a third one of the at least one piezoresistive resistor strip is provided near the longitudinal center line on a side of the first one of the at least one piezoresistive resistor strip,
and a fourth one of the at least one piezoresistive resistor strip is provided near the longitudinal center line on a side of the second one of the at least one piezoresistive resistor strip.

6. The pressure sensor device as recited in claim 4, wherein a first distance of the first one of the at least one piezoresistive resistor strip from the one longitudinal edge and a second distance of the second one of the at least one piezoresistive resistor strip from the other longitudinal edge as well as a third distance of the third one of the at least one piezoresistive resistor strip from the longitudinal center line, and a fourth distance of the fourth one of the at least one piezoresistive resistor strip from the longitudinal center line are in each case constant.

7. The pressure sensor device as recited in claim 6, wherein the first distance is equal to the second distance, and the third distance is equal to the fourth distance.

8. The pressure sensor device as recited in claim 1, wherein the piezoresistive resistance device includes four piezoresistive resistor strips that are substantially uniformly designed and symmetrically arranged with respect to a longitudinal center line of the diaphragm region, wherein first and second ones of the four piezoresistive resistor strips run parallel to the longitudinal edges of the diaphragm region across an entire length of the diaphragm region and onto the surrounding portion of the sensor substrate, wherein third and fourth ones of the four piezoresistive resistor strips run parallel to the longitudinal edges of the diaphragm region across the surrounding portion of the sensor substrate, and wherein the first and second ones of the four piezoresistive resistor strips have a narrow center region and widened end regions, and wherein the widened end regions run across the short edges of the diaphragm region.

9. The pressure sensor device as recited in claim 8, wherein the first one of the four piezoresistive resistor strips is provided near the one longitudinal edge, and the second one of the four piezoresistive resistor strips is provided near the other longitudinal edge.

10. The pressure sensor device as recited in claim 8, wherein the third one of the four piezoresistive resistor strips and the fourth piezoresistive resistor strip are provided on the sensor substrate in such a way that the third one of the four piezoresistive resistor strips and the fourth piezoresistive resistor strip lie outside of a stress field of the diaphragm region.

11. The pressure sensor device as recited in claim 9, wherein a first distance of the first one of the four piezoresistive resistor strips from the one longitudinal edge and a second distance of the second one of the four piezoresistive resistor strips from the other longitudinal edge are in each case constant.

12. The pressure sensor device as recited in claim 11, wherein the first distance is equal to the second distance.

13. The pressure sensor device as recited in claim 1, wherein the diaphragm region is produced in such a way that a cavity is created using porous silicon in front of an epitaxy layer in the diaphragm region and is transferred in the epitaxy so as to create a hollow space underneath the diaphragm region.

* * * * *